(12) United States Patent
Sakr et al.

(10) Patent No.: US 11,585,976 B2
(45) Date of Patent: Feb. 21, 2023

(54) OPTICAL FIBER WITH CORRUGATIONS

(71) Applicants: Saudi Arabian Oil Company, Dhahran (SA); University of Southampton, Southampton (GB)

(72) Inventors: Hesham Sakr, Southampton (GB); Hans Christian Hansen Mulvad, Southampton (GB); Shaif-ul Alam, Southampton (GB); Lin Xu, Chandlers Ford (GB); Callum Smith, Frederiksberg (DK); John Hayes, Fordingbridge (GB); David Richardson, Southampton (GB); Francesco Poletti, Southampton (GB); Damian Pablo San Roman Alerigi, Al-Khobar (SA); Sameeh Issa Batarseh, Dhahran Hills (SA)

(73) Assignees: SAUDI ARABIAN OIL COMPANY, Dhahran (SA); University of Southampton, Southampton (GB)

( * ) Notice: Subject to any disclaimer, the term of this patent is extended or adjusted under 35 U.S.C. 154(b) by 0 days.

(21) Appl. No.: 17/220,870

(22) Filed: Apr. 1, 2021

(65) Prior Publication Data
US 2022/0317365 A1    Oct. 6, 2022

(51) Int. Cl.
*G02B 6/02* (2006.01)
(52) U.S. Cl.
CPC ................. *G02B 6/02052* (2013.01)
(58) Field of Classification Search
CPC .............................................. G02B 6/02052
See application file for complete search history.

(56) References Cited

U.S. PATENT DOCUMENTS

| | | | | |
|---|---|---|---|---|
| 3,891,302 A * | 6/1975 | Dabby | ................... | G02B 6/124 385/124 |
| 5,995,697 A * | 11/1999 | Byron | ................ | G02B 6/02104 398/1 |
| 6,073,465 A * | 6/2000 | Oleskevich | ......... | H01S 3/06708 65/390 |
| 6,130,974 A * | 10/2000 | Rivoallan | ................ | G02B 6/14 385/124 |
| 6,909,823 B1 * | 6/2005 | Sorin | ...................... | G02F 1/125 385/28 |
| 7,352,967 B1 * | 4/2008 | Katayama | ................ | H04N 7/22 348/E7.024 |
| 2007/0009216 A1 | 1/2007 | Russell et al. | | |

(Continued)

FOREIGN PATENT DOCUMENTS

| CN | 109581580 A | 4/2019 |
|---|---|---|
| WO | 2010001132 A1 | 1/2010 |
| WO | 2015185761 A1 | 12/2015 |

OTHER PUBLICATIONS

F. Poletti, "Nested antiresonant nodeless hollow core fiber," Optics Express, vol. 22, No. 20, pp. 23807-23828, 2014.

(Continued)

*Primary Examiner* — Ellen E Kim
(74) *Attorney, Agent, or Firm* — Leason Ellis LLP

(57) ABSTRACT

An optical fiber has corrugations on an outer surface to dissipate a portion of an input light beam, allowing the remaining portion of the light beam to be coupled to the optical fiber. By dissipating the portion of input light, damage to the optical fiber by uncoupled light is reduced.

20 Claims, 3 Drawing Sheets

(56) References Cited

U.S. PATENT DOCUMENTS

| | | |
|---|---|---|
| 2011/0243496 A1 | 10/2011 | Jones |
| 2012/0134012 A1 | 5/2012 | Guerin et al. |
| 2015/0277033 A1 | 10/2015 | Li et al. |
| 2016/0209586 A1 | 7/2016 | Fokoua et al. |
| 2016/0338601 A1 | 11/2016 | Yang |
| 2017/0370894 A1 | 12/2017 | Chiniforooshan et al. |
| 2018/0309262 A1* | 10/2018 | Machida ............... H01S 3/1312 |
| 2020/0156987 A1 | 5/2020 | Wheeler et al. |

OTHER PUBLICATIONS

Extended European Search Report in corresponding EP Application No. 22166398.2, dated Aug. 5, 2022; 7 pages.

* cited by examiner

OPTICAL FIBER WITH CORRUGATIONS

FIELD OF THE DISCLOSURE

The present disclosure relates generally to optical fibers, and, more particularly, to an optical fiber with corrugations on an outer surface.

BACKGROUND OF THE DISCLOSURE

As shown in FIG. 1 of international application WO2015/185761, a Nested Antiresonant Nodeless hollow core optical Fiber (NANF) of the prior art has a first tubular, cladding element 1 which defines an internal cladding surface 3. A plurality of second tubular elements 5 are also included which are arranged in a spaced symmetrical relation at the cladding surface 3 and together define a core 9 with a radius R from the center of the NANF. A further plurality of third tubular elements 7 are each nested within a respective one of the second tubular elements 5. The nested ones of the second and third tubular elements 5, 7 provide nested tubular arrangements 11a-11f. In the prior art, the core radius R is typically less than 30 µm. Other parameters and dimensions of the NANF include a wall thickness t of each of the tubular elements 5, 7, a gap distance d between tubular elements 5, and a distance z between the portions of the tubular elements 5, 7 closest to the center of the NANF.

As light is input to an optical fiber such as a NANF, a portion of the input light can be uncoupled to the glass structure of the fiber. That is, the portion of the input light which is not properly coupled will not propagate in a core guided mode of the optical fiber. Rather, such uncoupled light propagates a short distance through the cladding glass structure, potentially causing thermal damage to the polymer cladding of the optical fiber.

SUMMARY OF THE DISCLOSURE

According to an embodiment consistent with the present disclosure, an optical fiber has corrugations on an outer surface to dissipate a portion of an input light beam, allowing the remaining portion of the light beam to remain localized in the core of the optical fiber. By dissipating the portion of input light propagating in the cladding, damage to the optical fiber by uncoupled light is reduced or eliminated.

In one embodiment, an optical fiber is configured to transmit input light. The optical fiber comprises an outer surface having an input portion configured to receive the input light. In addition, a plurality of corrugations are on the outer surface and are configured to dissipate a portion of the input light. The outer surface surrounds a core region disposed within the outer surface. The core region is configured to transmit the remaining light. The plurality of corrugations extend along a length L of the input portion, with the length L being between 2 mm and 200 mm. The plurality of corrugations include a plurality of trenches, such that each trench has a trench radial depth in the range of 60 µm to 120 µm. Alternatively, each trench has a trench longitudinal length in the range of 60 µm to 120 µm. The plurality of corrugations are designed to dissipate most of the light guided in the cladding of the fiber.

In another embodiment, a method for transmitting input light comprises providing an optical fiber including a core region and a surrounding outer surface. The outer surface includes an input portion having a plurality of corrugations on the outer surface. The method also includes receiving the input light at the input portion, and dissipating a portion of the input light using the plurality of corrugations. The method then transmits the remaining light through the core region. The plurality of corrugations extend along a length L of the input portion, with the length L being in the range of 2 mm to 200 mm. The plurality of corrugations include a plurality of trenches, such that each trench has a trench radial depth in the range of 60 µm to 120 µm. Alternatively, each trench has a trench longitudinal length in the range of 60 µm to 120 µm. The plurality of corrugations can dissipate the vast majority of the light guided in the cladding of the fiber.

In a further embodiment, a system comprises an optical fiber configured to transmit input light. The optical fiber includes an outer surface having an input portion configured to receive the input light. The outer surface further includes a plurality of corrugations configured to dissipate a portion of the input light. A core region is disposed within the outer surface and is configured to transmit the remaining light. The system includes a cooling system configured to absorb the dissipated portion of the input light. The cooling system can include a water-cooled heat sink positioned adjacent to the plurality of corrugations. The plurality of corrugations extend along a length L of the input portion, with the length L in the range of 2 mm to 200 mm. The plurality of corrugations include a plurality of trenches, such that each trench has a trench radial depth in the range of 60 µm to 120 µm. Alternatively, each trench has a trench longitudinal length in the range of 60 µm to 120 µm.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to an optical fiber which has corrugations on an outer surface to dissipate a portion of an input light beam.

Figure 1:
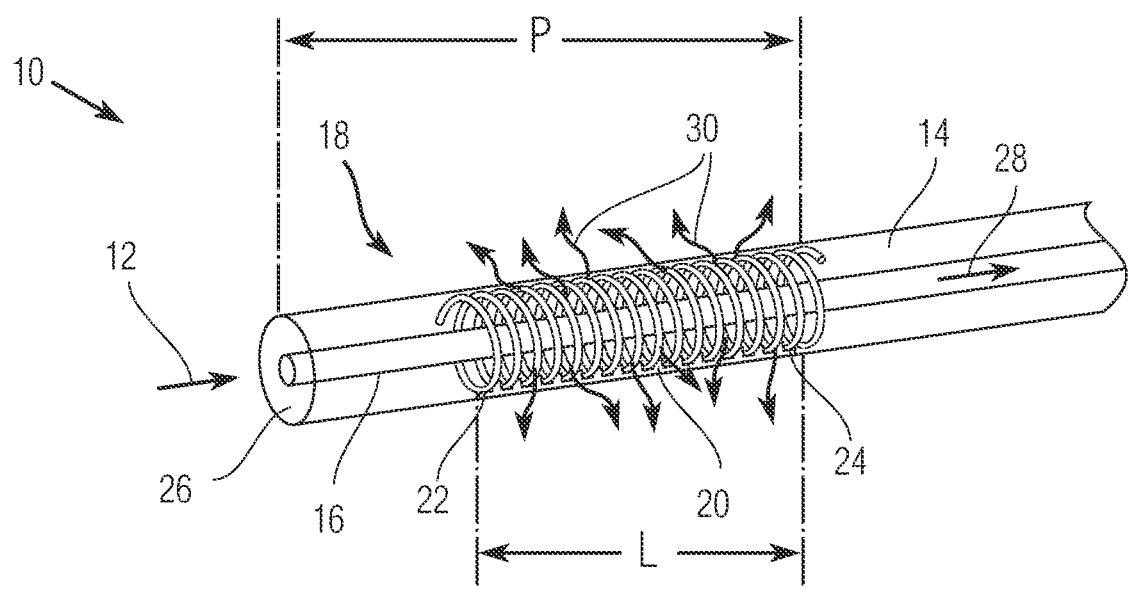
FIG. 1 is top front side perspective view of an optical fiber with corrugations according to an embodiment.

As shown in FIG. 1, an optical fiber 10 is configured to transmit input light 12. The optical fiber 10 has an outer surface 14 of the glass structure of the fiber 10, and a core region 16 configured to transmit the light 12 along the length of the optical fiber 10. In one embodiment, the core region 16 can be an air-filled region. In another embodiment, the core region 16 contains a vacuum. In still a different embodiment, the core region 16 can include a predetermined gas, such as an inert gas. An input portion 18 of the optical fiber 10 has a length P and is configured to receive the input light 12. A plurality of corrugations 20 are fabricated on the outer surface 14 of the optical fiber 10 (see detail view of FIG. 2). The fabrication is performed, for example, using a cutting beam emitted from a $CO_2$ laser. In other embodiments, other known fabrication methods can be used to form the plurality of corrugations 20 in the optical fiber, for example etching or grinding. The corrugations 20 are fabricated along the input portion 18 of the optical fiber 10. Accordingly, the corrugations 20 extend along a length L of the optical fiber 10, such that L is less than or equal to P. In an example embodiment, the length L is in the range of about 2 mm to about 200 mm.

In one embodiment, shown in FIG. 1, the corrugations 20 begin at a start position 22 on the outer surface 14, extend along the length P of the outer surface 14, and end at a terminal position 24 on the outer surface 14. In another embodiment, the start position 22 of the corrugations 20 is at an input region 26 of the input portion 18 of the optical fiber 10, that is, at the coupling location to a light source (e.g., laser).

The plurality of corrugations 20 are fabricated to dissipate out a portion of the input light 12 that has coupled from the core into the cladding of the fiber. Alternatively, the corrugations 20 scatter a portion of the input light 12. In a further embodiment, the corrugations 20 strip out a portion of the input light 12. The core region 16 is configured to transmit the remaining light 28.

In particular, any light 30 that is uncoupled to the core region 16 is allowed to dissipate. That is, such light 30 is coupled into the glass structure forming the optical fiber 10 rather than being coupled and guided into the fundamental mode of the optical fiber 10. Accordingly, the corrugations 20 dissipate the light 30 before the light 30 can propagate down the optical fiber 10 itself. By employing such corrugations 20 to dissipate the light 30, the potential for thermally-induced damage along the optical fiber 10 is reduced. Alternatively, such corrugations 20 eliminate such thermally-induced damage.

In an example embodiment, the coupling of the light 12 to some types of optical fibers can be 90% efficient in transmitting the coupled light through core region 16. For instance, one such optical fiber that benefits from the structural corrugations of the present disclosure is a nested antiresonant nodeless fiber (NANF). A NANF can have a hollow core region 16 filled with air. In another embodiment, a NANF can have a vacuum in the hollow core region 16. In still another embodiment, the NANF can have a gas within the hollow core region 16, such as an inert gast. With the optical fiber 10 structured as a NANF and having the corrugations 20 in the outer surface 14, the optical fiber 10 can be 90% efficient in transmitting the coupled light through core region 16. The remaining 10% of energy is due to the uncoupled light being scattered out of the optical fiber 10. Accordingly, such dissipation of 10% of the energy from the uncoupled light reduces the possibility of thermally-induced fiber damage. Alternatively, such dissipation of 10% of the energy eliminates such thermally-induced fiber damage.

Figure 2:
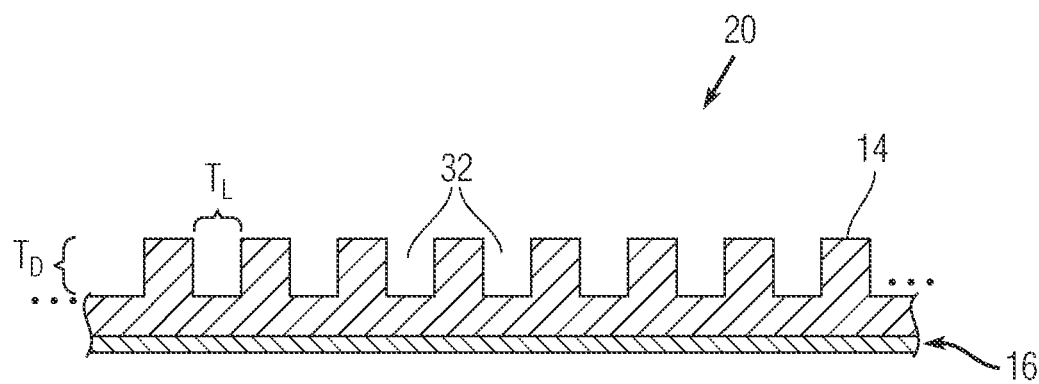
FIG. 2 is a side cross-sectional view of the corrugations in FIG. 1.

As shown in FIG. 2, the plurality of corrugations 20 are formed as a plurality of trenches 32 in the outer surface 14. As stated above, the fabrication of the trenches 32 as the corrugations 20 is performed, for example, using a cutting beam emitted from a CO2 laser. In other embodiments, other known fabrication methods can be used to form the trenches 32 the plurality of corrugations 20, for example etching or mechanical grinding. In one embodiment, each trench 32 has a trench radial depth $T_D$ in the range of 60 µm to 120 µm. In another embodiment, each trench 32 has a trench longitudinal length $T_L$ in the range of 60 µm to 120 µm.

Figure 3:
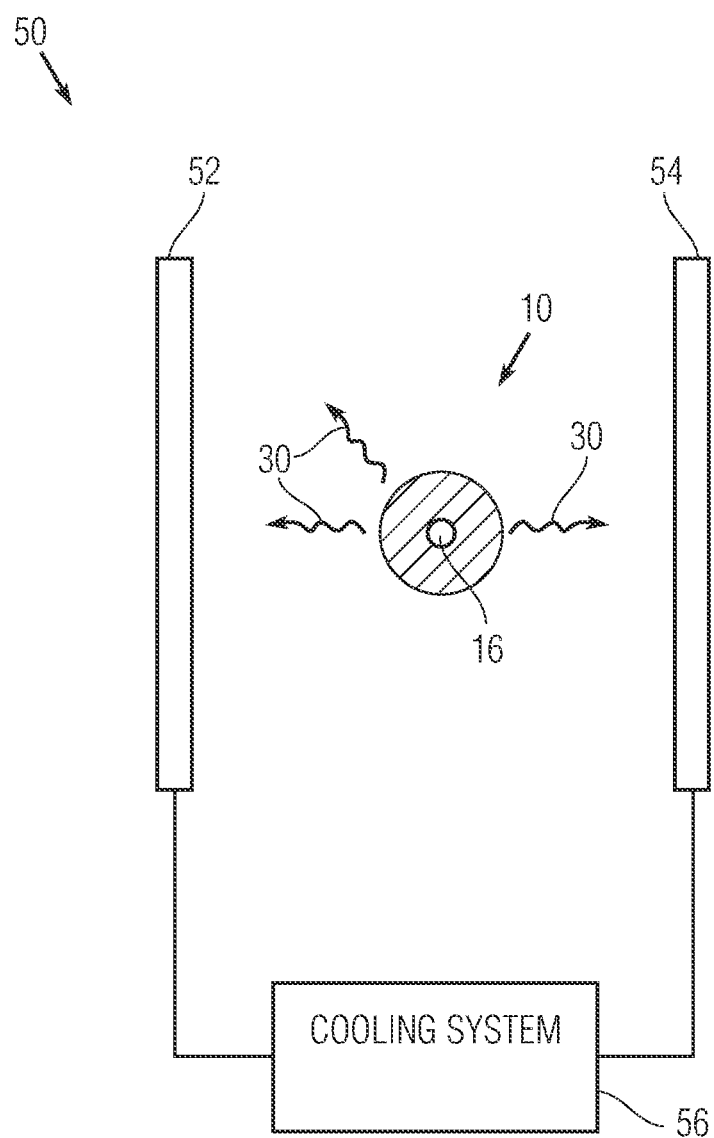
FIG. 3 is a schematic of a system having the optical fiber of FIG. 1 and a cooling system.

Referring to FIG. 3, a system 50 includes the optical fiber 10 emitting the dissipated light 30. The system 50 also includes at least one heat sink in close proximity to the optical fiber 10. In an embodiment, there are two heat sinks 52, 54 surrounding the optical fiber 10. In more particular constructions, the heat sinks can comprise metal plates which can optionally be water cooled. The light 30 stripped out of the optical fiber 10 in the input portion 18 of the fiber 10, close to the input region 26, can be absorbed by the heat sinks 52, 54. The absorption of the light 30 prevents a considerable amount of optical power from traveling down the fiber 10. Such optical power can cause problems and interfere with the performance of the subsequent sections of the fiber 10. In one embodiment, the heat sinks 52, 54 are selected from structures known in the art for dissipating the heat energy.

In another embodiment, the heat sinks 52, 54 are connected to a cooling system 56 known in the art and configured to proactively cool the heat sinks 52, 54. For example, the cooling system can be water-cooled.

Figure 4:
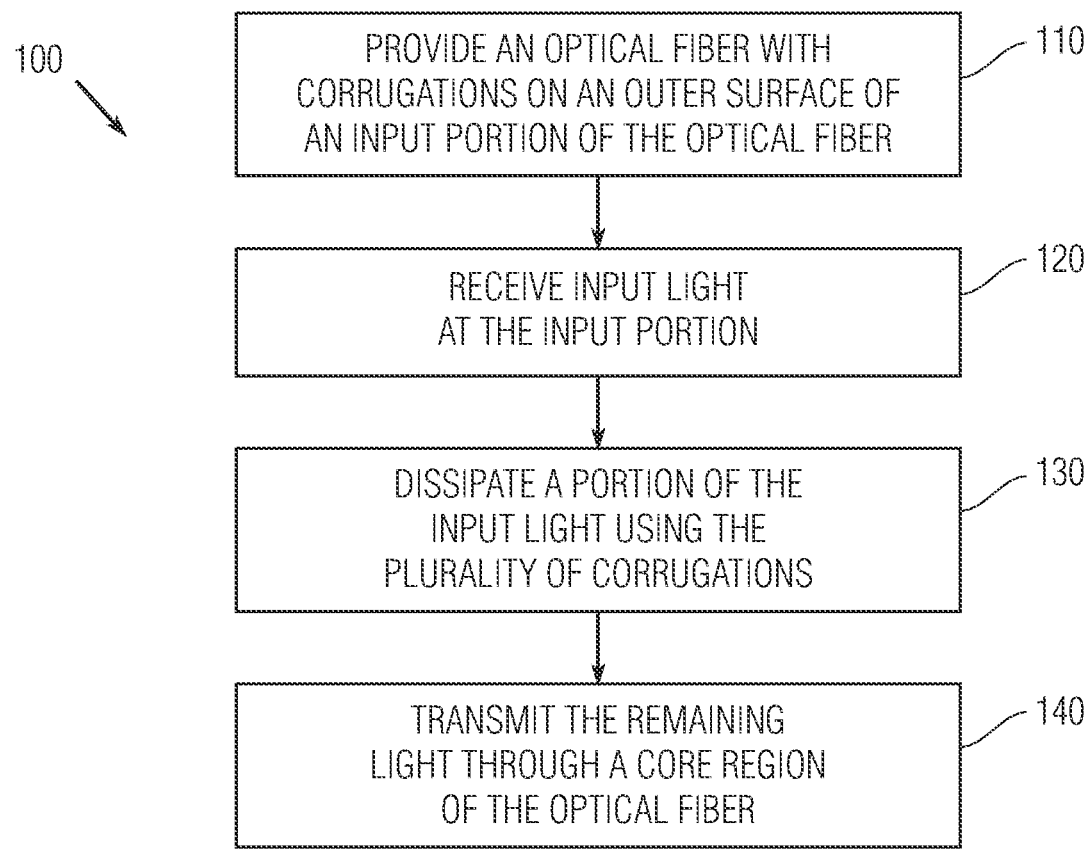
FIG. 4 is a flowchart of a method using the optical fiber of FIG. 1.

Referring to FIG. 4, a method 100 transmits light 12 input to the optical fiber 10 in FIG. 1. The method 100 includes providing the optical fiber 10 in step 110. The optical fiber 10 includes the core region 16 and the surrounding outer surface 14. The outer surface 14 includes an input portion 18 as an initial portion. The outer surface 14 has the plurality of corrugations 20. The optical fiber 10 then receives the input light 12 at the input portion 18 in step 120. A portion 30 of the input light 12 is dissipated using the plurality of corrugations 20 in step 130. The remaining light 28 is transmitted through the core region 16 in step 140.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An optical fiber, comprising:
   a core region extending in a first direction; and
   a glass structure surrounding the core region and including an outer surface having:
      an input portion configured to receive input light; and
      a plurality of corrugations cut into the outer surface of the glass structure and configured to dissipate a portion of the input light externally out of the optical fiber in a second direction perpendicular to the first direction,
   wherein the core region is configured to transmit the non-dissipated light in the first direction.

2. The optical fiber of claim 1, wherein the plurality of corrugations extend along a length L of the input portion.

3. The optical fiber of claim 2, wherein the length L is in the range of 2 mm to 200 mm.

4. The optical fiber of claim 1, wherein the plurality of corrugations include a plurality of trenches.

5. The optical fiber of claim 4, wherein each trench has a trench radial depth in the range of 60 µm to 120 µm.

6. The optical fiber of claim 4, wherein each trench has a trench longitudinal length in the range of 60 µm to 120 µm.

7. The optical fiber of claim 1, wherein the plurality of corrugations dissipates 90% of the input light guided in the cladding.

8. A method, comprising:
   providing an optical fiber composed of a core region extending in a first direction and a glass structure surrounding the core region and having an outer surface, the outer surface including an input portion;
   cutting a plurality of corrugations into the outer surface of the glass structure;
   receiving input light at the input portion;
   dissipating a portion of the input light externally out of the optical fiber in a second direction perpendicular to the first direction using the plurality of corrugations; and
   transmitting the non-dissipated light through the core region.

9. The method of claim 8, wherein the plurality of corrugations extend along a length L of the input portion.

10. The method of claim 9, wherein the length L is in the range of 2 mm to 200 mm.

11. The method of claim 8, wherein the plurality of corrugations include a plurality of trenches.

12. The method of claim 11, wherein each trench has a trench radial depth in the range of 60 µm to 120 µm.

13. The method of claim 11, wherein each trench has a trench longitudinal length in the range of 60 µm to 120 µm.

14. The method of claim 8, wherein the plurality of corrugations dissipates 90% of the light guided in the cladding of the fiber.

15. A system comprising:
   an optical fiber including:
      a core region extending in a first direction; and
      a glass structure surrounding the core region and including an outer surface having:
         an input portion configured to receive input light; and
         a plurality of corrugations cut into the outer surface of the glass structure and configured to dissipate a portion of the input light externally out of the optical fiber in a second direction perpendicular to the first direction; and
      wherein the core region is configured to transmit the non-dissipated light in the first direction; and
   a cooling system configured to absorb the dissipated portion of the input light emitted externally out of the optical fiber in the second direction.

16. The system of claim 15, wherein the cooling system includes a water-cooled heat sink positioned adjacent to the plurality of corrugations.

17. The system of claim 15, wherein the plurality of corrugations extend along a length L of the input portion, with the length L in the range of 2 mm to 200 mm.

18. The system of claim 15, wherein the plurality of corrugations include a plurality of trenches.

19. The system of claim 15, wherein each trench has a trench radial depth in the range of 60 µm to 120 µm.

20. The system of claim 15, wherein each trench has a trench longitudinal length in the range of 60 µm to 120 µm.

* * * * *